Patented Jan. 18, 1949

2,459,526

UNITED STATES PATENT OFFICE 2,459,526

1-NAPHTHYLMETHYL TETRADECYL ETHER AS AN INSECTICIDE

Ingenuin Hechenbleikner, Stamford, Conn., assignor to American Cyanamid Company, New York, N. Y., a corporation of Maine No Drawing. Original application May 31, 1940, Serial No. 338,047. Divided and this application October 23, 1944, Serial No. 560,029. In Canada April 9, 1941

5 Claims. (Cl. 167—32)

The present invention relates to an insecticide and more particularly to a compound which is especially effective as a contact poison for the control of insect pests, and its method of use.

It has been discovered that 1-naphthylmethyl tetradecyl ether possesses powerful insecticidal and ovicidal activity particularly against sucking and soft-bodied insects and their eggs, and that such activity is attained without any substantial harmful or detrimental action on the vegetation infested with the insect.

The following example in which the parts are by weight illustrates a specific method of preparing the compound.

Example 3 parts of metallic sodium, 50 parts of tetradecyl alcohol and 45 parts of benzene were placed in a vessel fitted with a reflux condenser. The mixture was refluxed for 48 hours under an atmosphere of hydrogen. The sodium had dissolved at the end of this period. 23 parts of 1-naphthylmethyl chloride were added and the mixture refluxed for an additional 24 hours. The reaction product was extracted with ether. The extract was washed with water, dried over sodium sulfate and distilled. The 1-naphthylmethyl tetradecyl ether was recovered as a slightly yellow oil boiling at 165° C. at about 1 mm. pressure.

Spray solutions were prepared by dissolving the 1-naphthylmethyl tetradecyl ether in a solvent medium consisting of 65% acetone and 35% water. A 100% control was obtained when a spray of 1-1000 dilution was used against the citrus red spider and its eggs. The insecticide also gave a 92.5% control on the citrus red spider with a spray of 1-4000 dilution.

1-naphthylmethyl tetradecyl ether, while especially effective for controlling the red spider and its eggs, may also be used for the control of aphids, white fly nymphs, garden fleahoppers and the like.

This new insecticide may be applied in any of the conventional manners. Thus, for example, it may be used as an aqueous solution, in an aqueous emulsion or it may also be incorporated in organic liquids such as the aliphatic and aromatic hydrocarbons for spraying purposes. It may be effectively used in ducts with solid diluents such as kieselguhr, wood flour, walnut shell and talc.

This application is a division of my copending application Serial No. 338,047, filed May 31, 1940, now Patent No. 2,411,428.

While the invention has been described with particular reference to specific embodiments, it is to be understood that it is not to be limited thereto but is to be construed broadly and restricted solely by the scope of the appended claims.

I claim:

1. A method of combating insect pests which includes exposing them to a toxic quantity of 1-naphthylmethyl tetradecyl ether.

2. An insecticidal composition including a toxic amount of 1-naphthylmethyl tetradecyl ether and a distender.

3. An insecticidal composition including a toxic amount of 1-naphthylmethyl tetradecyl ether incorporated in an aqueous emulsion.

4. An insecticidal composition including a toxic amount of 1-naphthylmethyl tetradecyl ether incorporated in an organic liquid solvent.

5. An insecticidal composition including a toxic amount of 1-naphthylmethyl tetradecyl ether incorporated in a solvent medium consisting of 65% acetone and 35% water.

INGENUIN HECHENBLEIKNER.

REFERENCES CITED

The following references are of record in the file of this patent:

FOREIGN PATENTS

| Number  | Country | Date          |
|---------|---------|---------------|
| 425,971 | Canada  | Feb. 27, 1945 |
| 516,280 | Germany | Jan. 12, 1931 |
| 536,889 | Germany | Oct. 28, 1931 |